United States Patent [19]

Carpenter

[11] 3,871,433
[45] Mar. 18, 1975

[54] ADAPTOR FOR TIRE CHANGING STANDS
[75] Inventor: David M. Carpenter, Nashville, Tenn.
[73] Assignee: The Coats Company, Inc., La Vergne, Tenn.
[22] Filed: Sept. 11, 1973
[21] Appl. No.: 396,186

[52] U.S. Cl.............................. 157/1.24, 144/288 A
[51] Int. Cl............................................. B60c 25/06
[58] Field of Search........................ 157/1, 1.24, 13; 144/288 A; 29/271, 273, 274; 76/79; 82/45; 408/75

[56] References Cited
UNITED STATES PATENTS
| | | | |
|---|---|---|---|
| 2,178,101 | 10/1939 | Hatch | 144/288 A |
| 2,818,685 | 1/1958 | Becker | 29/271 |
| 3,463,208 | 8/1969 | Turpin | 144/288 A |
| 3,580,320 | 5/1971 | Roberts | 157/1.24 |

Primary Examiner—Al Lawrence Smith
Assistant Examiner—Harold P. Smith, Jr.
Attorney, Agent, or Firm—Hofgren, Wegner, Allen, Stellman & McCord

[57] ABSTRACT

An adaptor for use with a tire changing stand whereby a variety of widely varying rim sizes may be secured to the changing stand to permit the performance of a tire changing operation thereon. The exemplary embodiment includes a base defined by two spaced plates, each having a central opening which is adapted to be received on the spindle of a tire changing stand. At least three fingers are pivotally mounted on the plates at spaced locations relative to each other and to the central opening therein for eccentric movement relative to the pivotal axis and a drive system interconnects each so that rotation of one finger will result in rotation of the others whereby the distance between the fingers and the radial distance between each finger and the central opening may be selectively adjusted.

5 Claims, 2 Drawing Figures

ADAPTOR FOR TIRE CHANGING STANDS

BACKGROUND OF THE INVENTION

This invention relates to adaptors for use with tire changing stands, and more specifically, to an adaptor having selectively adjustable tire rim engaging elements.

The most pertinent prior art known to the applicants includes Scott U.S. Pat. No. 3,474,840; Sorensen et al. U.S. Pat. No. 3,685,565; Garth U.S. Pat. No. 3,211,206; and Roberts U.S. Pat. No. 3,580,320.

Tire changing stands having a center post or spindle for receiving a wheel rim are common in the art. Typical is that illustrated in Strang et al. U.S. Pat. No. 3,255,800. Typically, a wheel rim is placed on the stand by impaling the same on the spindle and a threaded clamp applied thereto to firmly clamp the rim to the stand to allow a tire changing operation to be performed.

The recent advent of special or decorative wheel rims, such as those made of magnesium, aluminum or those having portions of nonmetallic material for decorative purposes, have created problems with respect to performing a tire servicing function due to the possibility of marring of the rim by the clamp member when the requisite clamping force is applied.

Moreover, the size and specific internal configuration of rims vary widely. For example, some rims have a ten inch dimension, while others may be as large as seventeen inches. Furthermore, some types of rims are mounted on vehicle by means of a plurality of bolt holes positioned around a greatly enlarged center opening.

With such rims, the conventional clamp employed can only be used with difficulty and, in many instances, not at all. Thus, attempts have been made, as exemplified by the structures illustrated in the above identified patents, to provide an adaptor whereby decorative rims and rims of differing characters may be securely clamped to a tire changing stand for tire servicing.

SUMMARY OF THE INVENTION

It is the principal object of the invention to provide a new and improved adaptor for use with tire changing stands. More particularly, it is an object of the invention to provide such an adaptor wherein rim engaging elements may be simply and easily adjusted so as to maximize the efficiency of a tire servicing operation.

The exemplary embodiment of the invention achieves the foregoing objects through a construction including a base having a central opening which may receive the upstanding spindle or center post on a tire changing stand and subsequently be clamped thereto through the use of a conventional clamp. The base mounts a plurality of at least three fingers, each having a free end which may be located in bolt receiving openings in a rim placed on the table and underlying the adaptor. Each of the fingers is mounted for rotation relative to the base at spaced locations thereon relative to each other and relative to the central opening. The mounting is such that the free end of each finger will move in an eccentric path when the finger is rotated.

A motion transmitting mechanism is provided to interconnect each of the fingers, whereby rotation of one finger will result in rotation of the others so that all may be simultaneously positioned for use with a given rim.

In the preferred embodiment, the base is defined by a pair of spaced, generally parallel plates with the motion transmitting mechanism located between the plates and housed thereby. Preferably, gears are associated with each of the fingers and a toothed belt is trained about the gears to provide the motion transmitting system.

In a highly perferred embodiment of the invention, a knob or manual actuator is associated with one of the fingers on a side of the base opposite that from which the fingers extend. Through manipulation of the knob, the locations of the fingers may be selectively adjusted as aforesaid.

Other objects and advantages of the invention will become apparent from the following specification taken in conjunction with the accompanying drawings.

DESCRIPTION OF THE PREFERRED EMBODIMENT

Figure 1:
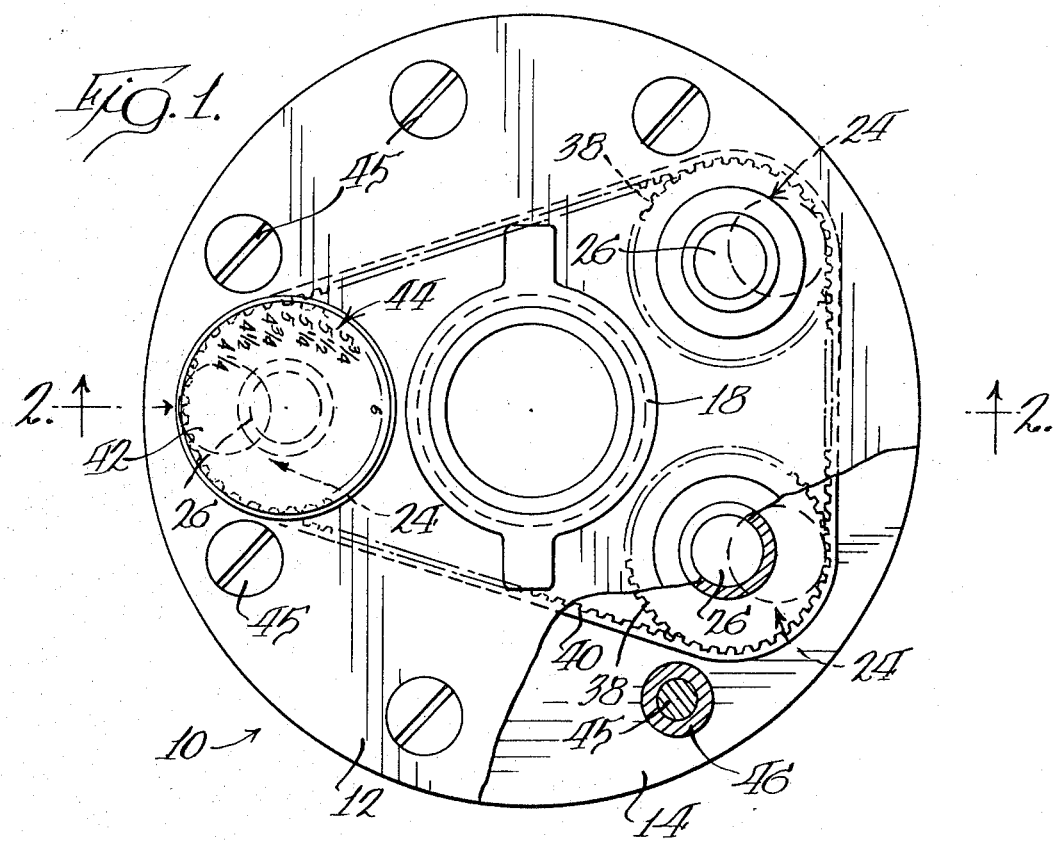
FIG. 1 is a plan view of an adaptor made according to the invention with parts broken away for clarity.
Figure 2:
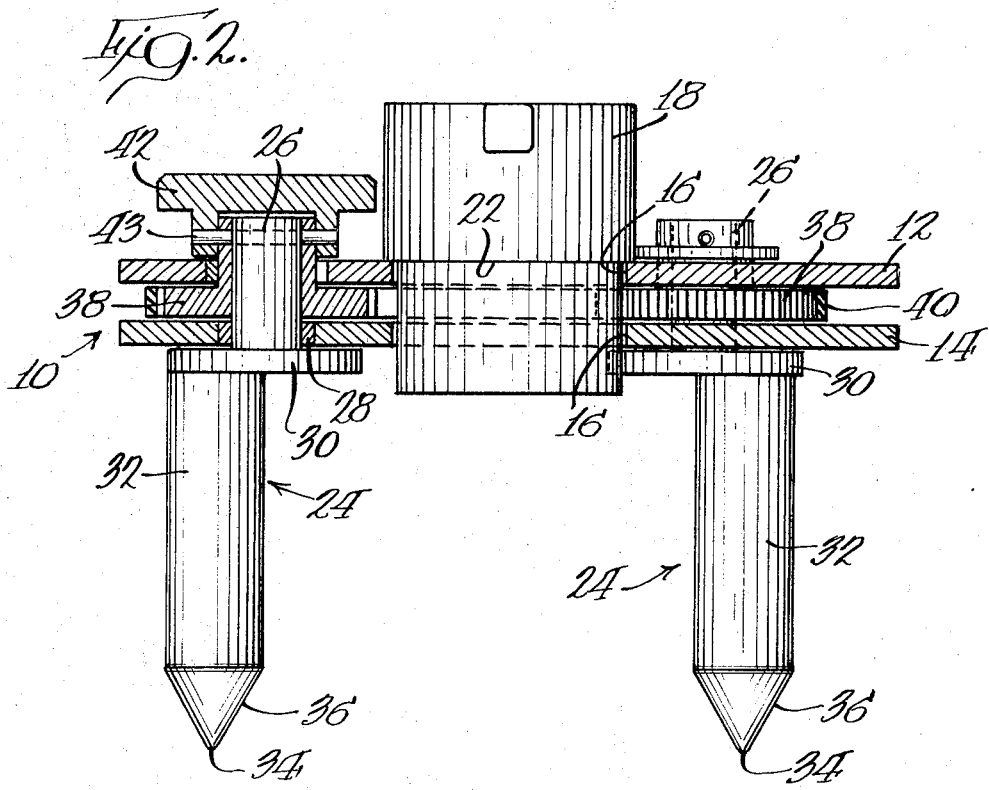
FIG. 2 is a vertical section taken approximately along the line 2—2 of FIG. 1.

With reference to the drawings, an exemplary embodiment of an adaptor for use with a tire changing stand is seen to include a base, generally designated 10, which is defined by a pair of spaced, parallel plates 12 and 14. Each of the plates 12 and 14 includes a central opening 16 through which is passed a collar 18.

The collar 18 has an internal threaded surface (not shown) whereby the same may be threaded on the center post of a tire changing stand. The collar 18 further includes a downwardly facing step 22 which engages the upper plate 12 about the periphery of the central opening 16 therein so that when the collar is threaded on a center post the base 10 may be firmly clamped to the stand.

As will be recognized, the collar 18 along with the base 10 are adapted to be placed about the spindle or center post of a conventional tire changing stand.

Extending outwardly from the plate 14 are a plurality of at least three fingers, each generally designated 24. Each finger 24 is identical to the others and, accordingly, only one will be explained in detail. Each finger 24 includes a stub shaft 26 which is journalled as by bearings 28 in the plates 12 and 14 for rotation relative thereto. One end of the stub shaft 26 emerges exteriorly of the plates 14 and is secured to the center of a disc 30 having a greater diameter than the stub shaft 26. Each disc 30, in turn, mounts an eccentric shaft 32 having a free end 34 defined by a cone 36 and which is adapted to be received in a bolt receiving opening in a tire rim mounted on the tire changing stand.

It will be recognized that by reason of the foregoing mounting of each of the fingers 24, the same may be moved in a circular path so that the distance between each finger 24 may be changed. In addition, the distance between each finger and the center of the base 10, as defined by the center of the central opening 16, may also be changed. As a result, the fingers 24 may be selectively adjusted to be received in bolt receiving openings located at different radial distance from the center of the rim and at varying circumferential positions on the rim.

Also provided is a motion transmitting mechanism whereby rotation of one of the fingers 24 about the axis defined by its stub shaft 26 is transmitted to the other fingers 24 so that all rotate in unison.

Between the plates 12 and 14, each stub shaft 26 receives a timing gear 38 which is secured as by a pin 43 to the corresponding stub shaft 26. Also within the plates 12 and 14 and housed thereby is a timing belt or toothed belt 40 which is trained about each of the gears 38. In the preferred embodiment, the number of teeth on each of the gears 28 is the same such that there will be equal rotation of each when one is rotated.

As can be seen, the position whereat each of the shafts 26 is journalled in the base 10 is spaced from the position of journalling of the other remaining stub shafts by an integral multiple of 72°, which multiple may be as little as one. The purpose of this arrangement is to accommodate a typical five bolt mounting most conventionally used in tire rims.

One of the stub shafts 26 may be secured as by the pin 43 mentioned previously to a manual actuator or knob 42 which is located externally of the plate 12. That is, the knob 42 is on the opposite side of the base 10 from the fingers 24. The knob 42 may be provided with suitable indicia, generally designated 44, to inform the user as to the particular position of the fingers 24. Adjustment is, of course, made by rotating the knob 42.

The assemblage is completed by screws 45 provided with sleeves 46 between the plates 12 and 14 for securing the plates 12 and 14 in assembled relation.

In use, a rim to be serviced is placed over the spindle or center post of the tire changing stand and then the adaptor is similarly fitted over the spindle. Through appropriate rotation of the knob 42, the fingers 24 are positionally adjusted until such time as the conical ends 36 of each enter into a corresponding bolt receiving hole on the underlying rim. At this time, the collar 18 may be applied and brought to bear against the plate 12 to firmly hold the adaptor in place so that the tire servicing operation may be performed.

From the foregoing, it will be appreciated that an adaptor made according to the invention achieves the objects of providing ready and simple adjustability of the rim engaging elements so as to maximize the efficiency of the tire changing operation. It will also be appreciated that the adaptor is economical in construction and that the use of the two plates 12 and 14 as a housing for the motion transmitting mechanism protects the moving parts thereof to insure long life.

I claim:

1. An adaptor for use with a tire changing stand, comprising: a base having a central opening for receipt of a spindle of a tire changing stand; a plurality of at least three fingers extending generally perpendicularly from said base, each having a free end remote and projecting away from said base adapted to engage a tire rim mounted on a tire changing stand; means, including an eccentric connection, pivotally mounting each of said fingers, at spaced locations, on said base and about said central opening; a motion transmitting mechanism interconnecting each of said fingers whereby when one is rotated, the others will be rotated and each will move in a circular path such that the spacing between each and the radial distance to the center of said central opening may be selectively adjusted so that said finger free ends may be properly located to engage rims of different sizes.

2. An adaptor according to claim 1 wherein said fingers all extend in one direction from one side of said base and further including a manual actuator located on the other side of said base and operatively associated with one of said fingers and said motion transmitting mechanism.

3. An adaptor according to claim 1 wherein said base is comprised of a pair of generally parallel, spaced plates and wherein said motion transmitting mechanism is located between and housed by said plates.

4. An adaptor according to claim 3 wherein said motion transmitting mechanism includes a plurality of at least three gears, one for each of said fingers, and a toothed belt trained about all of said gears.

5. Apparatus according to claim 4 wherein each of said fingers is defined by a stub shaft journalled in said plates, said gears being secured to corresponding ones of said stub shafts; each said eccentric connection being defined by an eccentric shaft eccentrically secured to a corresponding one of said stub shafts exteriorly of said plate, each said free end of said fingers being defined by a conical tip on a corresponding one of said eccentric shafts.

* * * * *